United States Patent
Yang et al.

(10) Patent No.: US 10,860,859 B2
(45) Date of Patent: Dec. 8, 2020

(54) BUDGET-AWARE METHOD FOR DETECTING ACTIVITY IN VIDEO

(71) Applicant: NVIDIA Corporation, Santa Clara, CA (US)

(72) Inventors: Xiaodong Yang, San Jose, CA (US);
Pavlo Molchanov, San Jose, CA (US);
Jan Kautz, Lexington, MA (US);
Behrooz Mahasseni, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 16/202,703

(22) Filed: Nov. 28, 2018

(65) Prior Publication Data

US 2019/0163978 A1    May 30, 2019

Related U.S. Application Data

(60) Provisional application No. 62/592,990, filed on Nov. 30, 2017.

(51) Int. Cl.
*G06T 7/194* (2017.01)
*G06K 9/00* (2006.01)
*G06K 9/62* (2006.01)

(52) U.S. Cl.
CPC ..... *G06K 9/00718* (2013.01); *G06K 9/00744* (2013.01); *G06K 9/00765* (2013.01);
(Continued)

(58) Field of Classification Search
CPC .................................................. G06T 7/194
See application file for complete search history.

(56) References Cited

U.S. PATENT DOCUMENTS 9,830,516 B1 * 11/2017 Biswas .............. G06K 9/00765
10,467,274 B1 * 11/2019 Ren ....................... G06K 9/4604
(Continued)

OTHER PUBLICATIONS

Shou et al., "CDC: Convolutional-De-Convolutional Networks for Precise Temporal Action Localization in Untrimmed Videos," IEEE Conference on Computer Vision and Pattern Recognition, 2017, 10 pages. Retrieved from https://arxiv.org/abs/1703.01515.
(Continued)

*Primary Examiner* — Cindy Trandai
(74) *Attorney, Agent, or Firm* — Leydig, Voit & Mayer, Ltd.

(57) ABSTRACT

Detection of activity in video content, and more particularly detecting in video start and end frames inclusive of an activity and a classification for the activity, is fundamental for video analytics including categorizing, searching, indexing, segmentation, and retrieval of videos. Existing activity detection processes rely on a large set of features and classifiers that exhaustively run over every time step of a video at multiple temporal scales, or as a small improvement computationally propose segments of the video on which to perform classification. These existing activity detection processes, however, are computationally expensive, particularly when trying to achieve activity detection accuracy, and moreover are not configurable for any particular time or computation budget. The present disclosure provides a time and/or computation budget-aware method for detecting activity in video that relies on a recurrent neural network implementing a learned policy.

21 Claims, 11 Drawing Sheets

(52) U.S. Cl.
CPC ........... *G06K 9/628* (2013.01); *G06K 9/6227* (2013.01); *G06K 9/6262* (2013.01)

(56) References Cited

U.S. PATENT DOCUMENTS

| | | | | |
|---|---|---|---|---|
| 10,521,715 | B1* | 12/2019 | Ioffe | G06N 3/08 |
| 2004/0151374 | A1* | 8/2004 | Lipton | G08B 31/00 382/181 |
| 2007/0183661 | A1* | 8/2007 | El-Maleh | G06T 7/194 382/173 |
| 2011/0293180 | A1* | 12/2011 | Criminisi | G06T 7/11 382/173 |
| 2016/0125621 | A1* | 5/2016 | Saitwal | G06K 9/38 382/165 |
| 2016/0189388 | A1* | 6/2016 | Gupta | G06T 7/187 382/180 |
| 2017/0083764 | A1* | 3/2017 | Risinger | G06T 7/251 |
| 2017/0124400 | A1* | 5/2017 | Yehezkel Rohekar | G06K 9/52 |
| 2017/0169314 | A1* | 6/2017 | Dijkman | G06K 9/6261 |
| 2018/0068463 | A1* | 3/2018 | Risser | G06T 7/45 |
| 2018/0075306 | A1* | 3/2018 | Mehrseresht | G06K 9/00348 |
| 2019/0180107 | A1* | 6/2019 | Pham | G06K 9/34 |

OTHER PUBLICATIONS

Escorcia et al., "DAPs: Deep Action Proposals for Action Understanding," European Conference on Computer Vision, 2016, 17 pages. Retrieved from https://pdfs.semanticscholar.org/5ef4/9174ca2b54c1bb54df828acc52075cf1634b.pdf.

Heilbron et al., "Fast Temporal Activity Proposals for Efficient Detection of Human Actions in Untrimmed Videos," IEEE Conference on Computer Vision and Pattern Recognition, 2016, 10 pages. Retrieved from http://openaccess.thecvf.com/content_cvpr_2016/papers/Heilbron_Fast_Temporal_Activity_CVPR_2016_paper.pdf.

Yeung et al., "End-to-end Learning of Action Detection from Frame Glimpses in Videos," Proceedings of the IEEE Conference on Computer Vision and Pattern Recognition, 2016, 10 pages. Retrieved from https://arxiv.org/pdf/1511.06984.pdf.

Oneata et al., "The LEAR submission at Thumos 2014," Thumos Challenge 2014, 7 pages. Retrieved from http://crcv.ucf.edu/THUMOS14/papers/INRIA%20LEAR.pdf.

Wang et al., "Action Recognition and Detection by Combining Motion and Appearance Features," Thumos Challenge, 2014, 6 pages. Retrieved from http://crcv.ucf.edu/THUMOS14/papers/CUHK&SIAT.pdf.

Yuan et al., "Temporal Action Localization with Pyramid of Score Distribution Features," IEEE Conference on Computer Vision and Pattern Recognition, 2016, 10 pages. Retrieved from https://www.cv-foundation.org/openaccess/content_cvpr_2016/papers/Yuan_Temporal_Action_Localization_CVPR_2016_paper.pdf.

Xu et al., "R-C3D: Region Convolutional 3D Network for Temporal Activity Detection," Proceedings of the International Conference on Computer Vision, 2017, 10 pages. Retrieved from http://openaccess.thecvf.com/content_ICCV_2017/papers/Xu_R-C3D_Region_Convolutional_ICCV_2017_paper.pdf.

Gomez et al., "Temporal Activity Detection in Untrimmed Videos with Recurrent Neural Networks," 1st NIPS Workshop on Large Scale Computer Vision Systems, 2016, 56 pages.

Shou et al., "Temporal Action Localization in Untrimmed Videos via Multi-stage CNNs," IEEE Conference on Computer Vision and Pattern Recognition, 2016, 10 pages. Retrieved from https://www.cv-foundation.org/openaccess/content_cvpr_2016/papers/Shou_Temporal_Action_Localization_CVPR_2016_paper.pdf.

Singh et al., "Untrimmed Video Classification for Activity Detection: submission to ActivityNet Challenge," ActivityNet Large Scale Activity Recognition Challenge workshop at CVPR, 2016, 4 pages. Retrieved from https://arxiv.org/pdf/1607.01979.pdf.

Richard et al., "Temporal Action Detection using a Statistical Language Model," IEEE Conference on Computer Vision and Pattern Recognition, 2016, 10 pages. Retrieved from https://www.cv-foundation.org/openaccess/content_cvpr_2016/papers/Richard_Temporal_Action_Detection_CVPR_2016_paper.pdf.

\* cited by examiner

BUDGET-AWARE METHOD FOR DETECTING ACTIVITY IN VIDEO

CLAIM OF PRIORITY

This application claims the benefit of U.S. Provisional Application No. 62/592,990 titled "BUDGET-AWARE ACTIVITY DETECTION WITH A RECURRENT POLICY NETWORK," filed Nov. 30, 2017, the entire contents of which is incorporated herein by reference.

TECHNICAL FIELD

The present disclosure relates to detecting activity in video.

BACKGROUND

Detection of activity in video content, and more particularly detecting in video content start and end frames inclusive of an activity and a classification for the activity, is fundamental for video analytics including categorizing, searching, indexing, segmentation, and retrieval of videos. For example, video-based content platforms, such as YouTube which hosts a wide variety of video content created by a very large user base, rely on activity detection processes to allow for searching, categorizing, etc. of the videos uploaded by its users. Recent improvements to activity detection processes have specifically focused on advancing activity detection accuracy. However, improved accuracy has been provided at the expense of processing time and computer resources (e.g. memory, processor, etc. consumption).

For example, some existing activity detection processes rely on a large set of features and classifiers that exhaustively run over every time step at multiple temporal scales. This sliding window approach is computationally expensive since it requires classification at every time step of a video. Some improvements have been made to these existing activity detection processes in order to avoid such exhaustive evaluations, where temporal segments of a video that are likely to contain a certain action are proposed, and then a separate classifier is applied to each of the proposed temporal segments for classification purposes. However, these improved activity detection processes are suboptimal for numerous reasons, including that they divide activity detection into two disjointed steps: proposal and classification, and also that they generally propose a large number of temporal segments which is still computationally expensive.

There is a need for addressing these issues and/or other issues associated with the prior art.

SUMMARY

A budget-aware method, computer readable medium, and system are disclosed for detecting activity in video. In use, a reinforcement learning algorithm is used to learn a policy to sequentially select a subset of frames of a video and classify activity within the subset of frames according to a plurality of predefined activity classifications. Additionally, a recurrent neural network uses the policy to detect and classify activity in the video over a sequence of steps determined according to a given time or computation budget. For each step of the plurality of steps, the detection includes selecting a subset of frames of the video, and predicting a segment from the selected subset of frames including a temporal location of the segment in the video, one or more of the plurality of predefined activity classifications associated with the segment, and a next subset of frames to select for a next step of the plurality of steps.

DETAILED DESCRIPTION

Detection of activity in video content, and more particularly detecting in video start and end frames inclusive of an activity and a classification for the activity, is fundamental for video analytics including categorizing, searching, indexing, segmentation, and retrieval of videos. Existing activity detection processes rely on a large set of features and classifiers that exhaustively run over every time step of a video at multiple temporal scales, or as a small improvement computationally propose segments of the video on which to perform classification. These existing activity detection processes, however, are computationally expensive, particularly when trying to achieve activity detection accuracy, and moreover are not configurable for any particular time or computation budget.

The present disclosure provides a budget-aware method for detecting activity in video. In particular, the activity detection method learns to optimally select a subset of video frames to process based on a given time or computation budget. Accordingly, the activity detection process can be optimized for the given time or computation budget.

Figure 1:
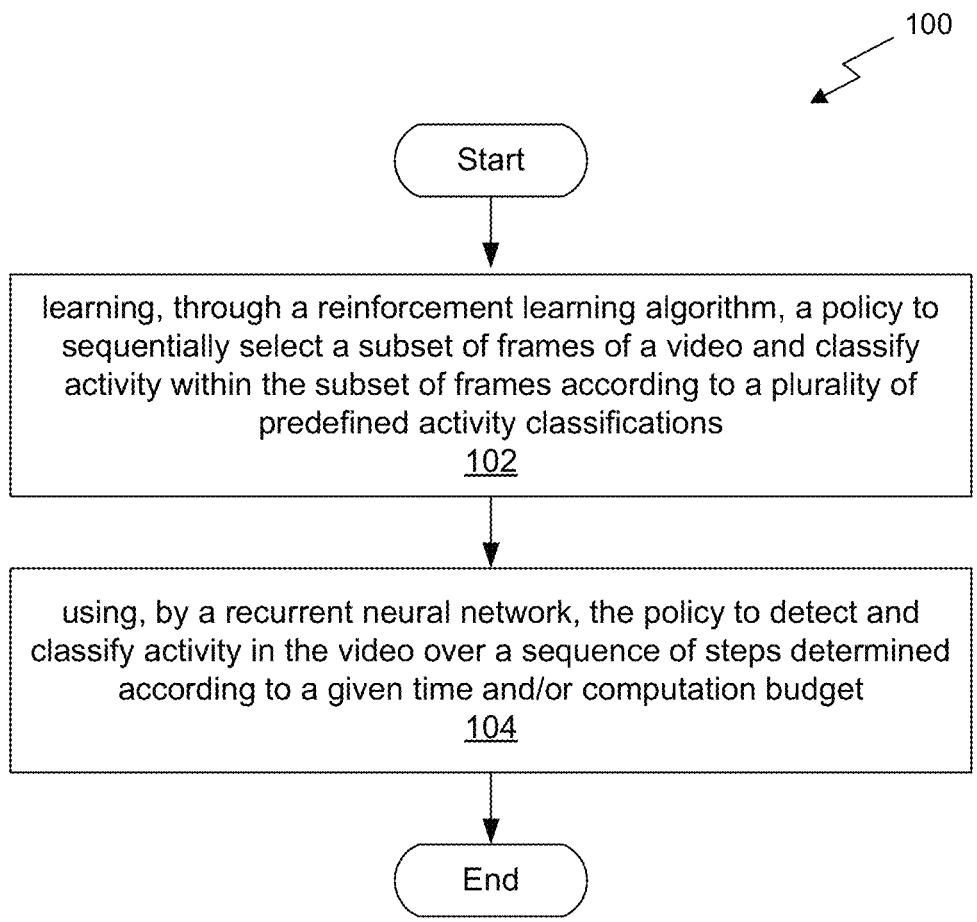
FIG. 1 illustrates a flowchart of a budget-aware method for detecting activity in video, in accordance with an embodiment.

FIG. 1 illustrates a flowchart of a budget-aware method for detecting activity in video, in accordance with an embodiment. In the context of the present description, the video includes any type or format of video content that is comprised of a sequence of displayable frames. The video may be short or long, depending on the number of frames included therein, and in any case is stored in computer memory. The activity detection method 100 is budget-aware in that it is dynamically adjusted according to a given (i.e. specified) time or computational budget. In other words, the activity detection method 100 is self-adjusting to detect activity within (i.e. without exceeding) a particular time given and/or a particular computational budget (i.e. bandwidth) given.

The method 100 may be performed by a processing unit, a program, custom circuitry, or by a combination thereof. For example, the method 100 may be executed by a GPU (graphics processing unit), CPU (central processing unit), or any processor such as those described below. Furthermore, persons of ordinary skill in the art will understand that any system that performs method 100 is within the scope and spirit of embodiments of the present disclosure.

In operation 102, a reinforcement learning algorithm is used to learn a policy to sequentially select a subset of frames of a video and classify activity within the subset of frames according to a plurality of predefined activity classifications. Thus, the policy, when used, implements a sequential decision making process where each step is a decision that determines the subset of frames in the video to select for activity detection purposes. In particular, at each sequential step, the policy receives as input a location of a frame to observe and a history of any prior observed frames, and then produces three outputs, including: (1) a temporal location (start and end) of a segment in the video having a detected activity, (2) one or more of the plurality of predefined activity classifications associated with the segment, and (3) a next frame for a next step of the sequential decision making process.

The policy is parameterized by θ, and the goal of the policy learning is to optimize the parameters of the policy by minimizing the loss incurred over the sequential steps, where loss refers to classification loss, localization loss, and/or retrieval loss. Since any estimated temporal segments (i.e. consecutive frames with a same activity classification) for a video will be computed through the sequence of steps, the objective function of the policy becomes non-decomposable and non-differentiable. Thus, in one embodiment, the policy is learned using a partially observable Markov decision process (POMDP), and as a further option the approximation of gradients for the objective function using a recurrent policy gradient approach. This allows the policy, and in particular its parameters, to be learned with stochastic gradient descent, in one embodiment.

Moreover, the reinforcement learning algorithm, which as noted above is used to learn the policy, may reward the policy as a function of a change in error. For example, the policy may earn a reward for (e.g. equal to) any decrease in the temporal segmentation error achieved by selecting a particular frame, and may pay a penalty when the temporal segmentation error increases.

Additionally, in operation 104, a recurrent neural network uses the policy to detect and classify activity in the video over a sequence of steps determined according to a given time and/or computation budget. Thus, the time (e.g. in seconds, etc.) and/or computation (e.g. in number of computations, etc.) budget may limit the number of sequential steps performed to detect and classify the activity in the video. For each step of the plurality of steps, the detection includes selecting a subset of frames of the video, and predicting a segment from the selected subset of frames including a temporal location of the segment in the video, one or more of the plurality of predefined activity classifications associated with the segment, and a next subset of frames to select for a next step of the plurality of steps.

As noted above, the policy may receive as input a location of a frame to observe and a history of any prior observed frames, and from that input the policy may then predict the aforementioned segment in the video. Specifically, the policy produces three outputs, including: (1) the temporal location (start and end) of the segment in the video having a detected activity, (2) one or more of the plurality of predefined activity classifications associated with the segment, and (3) a next frame for a next step of the sequential decision making process. The policy produces the output based on local information of a neighborhood of frames centered on the frame to observe and the history of the prior observed frames.

To this end, the recurrent neural network may use the learned policy to detect and classify activity in the video over a sequence of steps that is determined according to a given time and/or computation budget. Moreover, use of the policy allows the activity detection accuracy to be maximized for the given time and/or computation budget.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Given a video v and a set of activity labels L, the goal is to predict for each frame a single label from L. Each temporal extent consisting of consecutive frames with the same label is called a semantic temporal segment. Given a limited time budget, it is infeasible to process every single frame in a video. So we aim to detect and classify the foreground segments by only observing a small subset of video frames $x \subset v$.

Assuming limited access to the frames of v, finding the optimal frame subset x is inherently a sequential decision making task. Accordingly, we draw on ideas from reinforcement learning—an area that focuses on learning for sequential decision making problems. Our aim is to learn a policy π, parameterized by θ, to sequentially select the frames from v and form the subset x. Alongside the selection process, π outputs the current belief about the foreground segment and the associated class label. This sequential decision making process intuitively resembles how humans search activities in a video, i.e., iteratively refine our estimated temporal boundaries by sequentially choosing a few frames to observe.

Let $\mathcal{G}$ denote the ground truth segments in v, and $\mathcal{M}^x$ be the set of estimated semantic temporal segments from observing x. We define the deterministic indicator $1_{m,g}$ to identify whether an estimated segment $m \in \mathcal{M}^x$ is assigned to a ground truth segment $g \in \mathcal{G}$:

$$1_{m,g} = \begin{cases} 1 & g = \arg\max_{g' \in \mathcal{G}} \alpha(m, g') \text{ subject to } \alpha > 0 \\ 0 & \text{otherwise} \end{cases} \quad \text{(Equation 1)}$$

where α is the intersection over union (IoU). Let $c_m$ and $c_g$ indicate the probability distribution and the one-hot representation of class label for segments m and g. For a subset of selected frames x and a set of predicted segments $\mathcal{M}^x$, our loss is defined as:

$$L_\theta = \qquad \text{(Equation 2)}$$

$$\sum_n \sum_t \sum_{m,g} [\lambda_c \Delta_{cls}(c_m, c_g) + \lambda_l \Delta_{loc}(l_m, l_g)] + \lambda_r \Delta_{ret}(\mathcal{M}^*, \mathcal{G})$$

where $\Delta_{cls}$ is the multi-class classification error, $\Delta_{loc}$ is the localization error with $l_m$ and $l_g$ identifying the locations of segments m and g, and $\Delta_{ret}$ is the segment retrieval error. The most important property of $\Delta_{ret}$ is that while it encourages the model to detect all foreground segments, it also discourages the model from producing many false positives.

We now explain how to formulate each individual error defined in Equation 2. In contrast to using a binary classification loss, we employ a multi-class cross-entropy loss $\Delta_{cls} = -c_g \log c_m$. Unlike penalizing the localization based on the absolute error, this loss should also depend on the duration of a segment, i.e., the same amount of absolute error should be treated differently for short and long intervals. This means that if the policy makes a small error for a short segment this error should be considered relatively large, otherwise the algorithm would ignore the small segments. With this intention, we define $$\Delta_{loc}(l_m, l_g) = \zeta(g) \times \|(m_s, m_e), (g_s, g_e)\|$$

where $\zeta(g)$ is a scaling factor which depends on the length of segment g, $\|\bullet\|$ is the distance between two segments, $m_s$ and $m_e$ are the start and end of segment m, similar for segment g. To define the segment retrieval loss $\Delta_{ret}(\mathcal{M}^*, \mathcal{G})$, we use the mAP criteria, where mean is over different class labels, and AP for each individual class is defined as AP($\mathcal{M}^*, \mathcal{G}$) = $\sum_i$ Prec($\mathcal{M}^*(i), \mathcal{G}$) $\times \Delta_{Recall}$, where $\mathcal{M}^*(i)$ is the subset of $\mathcal{M}^*$ until the ith segment ranked by the overlap with ground truth, Prec($\bullet$) is the precision of detection, and $\Delta_{Recall}$ is the change of recall from previous subset. Given a training set of N videos $\{v_1, \ldots, v_N\}$, our goal is to find $\theta$ that minimizes:

$$\theta^* = \underset{\theta}{\arg\min}\left[ \mathbb{E}(L_\theta) \approx \frac{1}{N}\sum_{n=1}^{N} L_\theta(\mathcal{M}_n^*, \mathcal{G}_n) \right] \qquad \text{(Equation 3)}$$

Unfortunately, the standard back-propagation is not applicable to learn the parameters in Equation 3, as the objective function in Equation 2 contains the non-differentiable components. This is mainly due to the non-decomposable AP, as well as the sequential decision making process in selecting video frames. In order to solve this difficulty, we reformulate our problem as a reinforcement learning problem, as described with reference to FIG. 2A below, which allows us to define an equivalent reward function to the original objective function.

Figure 2A:
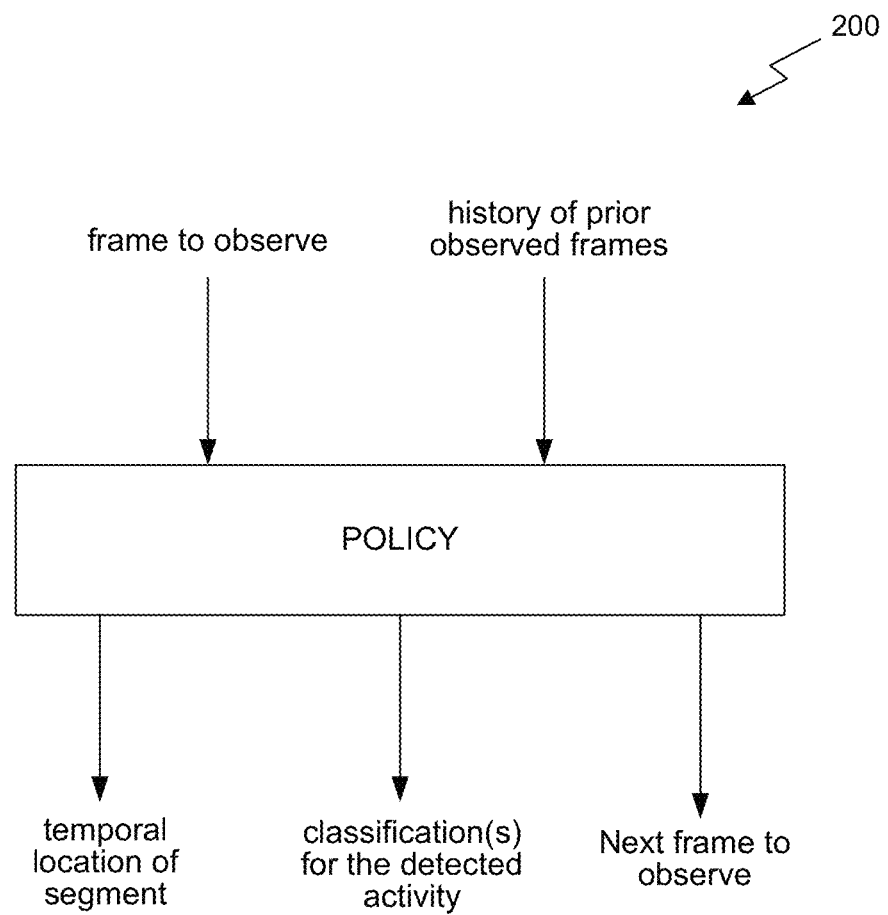
FIG. 2A illustrates a block diagram of the inputs and outputs for a policy usable by a recurrent neural network to detect activity in a video according to a given time and/or computational budget, in accordance with an embodiment.

FIG. 2A illustrates a block diagram 200 of the inputs and outputs for a policy usable by a recurrent neural network to detect activity in a video according to a given time and/or computational budget, in accordance with an embodiment. For example, the policy described with respect to FIG. 2A may be one embodiment of the policy learned and used in the manner described above with reference to the method 100 of FIG. 1.

In the present embodiment, policy π with parameters θ is learned for use by a recurrent neural network to detect activity in a video according to a given time and/or computational budget. The recurrent neural network uses the policy π to make a sequence of decisions, or predictions, based on the local information from the most recent observed frame, as described in more detail below with respect to FIG. 2B. At each step, the policy produces three outputs including the estimate of the start frame and end frame of the current potential temporal segment, the prediction of the classification(s) associated with the segment, and the next frame to observe. Unlike binary classification models, this approach uses a multi-class classifier, which means only the single policy π needs to be trained rather than training multiple different policies for each different classification. This approach avoids a binary prediction indicator signal, since it can directly discard those segments predicted with the background classification.

Due to the local observation at each step, the policy has no access to the global state (i.e., the entire video). This resembles the partially observable Markov decision process (POMDP), which assumes that despite the existence of a global state, for practical reasons an agent does not have a full observation of the global state. A recurrent policy gradient approach is used to maintain an approximate belief of the current state $s_t$ by Long Short-Term Memory (LSTM).

Particularly, suppose at step t the current frame is i, the policy π makes a decision based on (1) the local information of a neighborhood $N_i$ centered around i and (2) the history of previous observations. The local information is captured through an observation feature $o_t = [\psi(N_i), \varphi(N_i), \xi t]$, where $\psi(N_i)$ is an indicator vector that identifies whether each frame in $N_i$ has been previously selected, $\varphi(N_j)$ is the average of per-class confidence predicted in $N_i$, and $\xi t \in [0,1]$ is the normalized location of the current frame at step t. The inclusion of $\xi t$ is helpful in encouraging the policy to cover broader video content. Excluding $\xi t$ may result in a considerable number of over-selection of frames. Note that for $\varphi$, the averaged confidence of estimated segments is computed, which share the frames in $N_i$. As for the history of the decision makings, the hidden state $h_{t-1}$ of LSTM is used to maintain the context of previous observations up to step t.

To summarize, the global state at step t is approximated by the internal state $h_t$ of LSTM, which depends on the current observation $o_t$ and the previous state $h_{t-1}$. Given $h_t$ the outputs of the policy π are $v_t = [l_t, c_t, \xi_{t+1}]$: (1) the location $l_t$ of an estimated temporal segment, (2) the probability distribution over activity class labels $c_t$, and (3) the location of the next observation $\xi_{t+1}$. This formulation allows the policy to perform both forward and backward frame selections. In order to further improve the exploration at training phase, instead of directly using $\xi_{t+1}$, the next selected location may be sampled from a Gausssian distribution with a mean equal to $\xi_{t+1}$ and a fixed variance.

The goal of policy learning is to jointly optimize the parameters of π by minimizing the loss of a sequence of policy actions as defined in Equation 2. These actions are taken from the initial state $s_0$, when no frames are selected, until the final state $s_T$, where T is the number of steps specified according to a time and/or computation budget.

The main difficulty in policy learning is that the estimated temporal segments $\mathcal{M}^*$ for a video are computed through a sequence of policy decisions, resulting in a non-decomposable and non-differentiable objective function. Moreover, a decision that the policy makes at any step depends on the history of decisions that the policy has made in previous steps, and also impacts the decisions available to the policy in the future. A recurrent policy gradient approach is used for addressing this POMDP problem, which provides better theoretical bounds on the learning objective to approximate the gradients of the non-decomposable and non-differentiable objective function, so that the policy can be efficiently learned with stochastic gradient descent.

To follow the general reinforcement learning formulation, let r be the immediate reward associated with a state $s_t$. Since $s_t \approx h_t$ in the policy, r is defined as $r(h_t) = L_0(\mathcal{M}^*_{t-1}, \mathcal{G}) - L_\theta(\mathcal{M}^*_t, \mathcal{G})$, where $L_0$ is the loss associated with a set of estimated temporal segments as defined in Equation 2. Intuitively, $r(h_t)$ states that the policy earns an immediate reward equal to the decrease in the temporal segmentation error achieved by selecting an observed frame, or pays a penalty if the temporal segmentation error increases. Let $R(H_t)$ be the discounted accumulated reward starting from the state $s_t$ and continuing the policy up to the final state:

$$s_T: R(H_t) = \sum_{t'=t}^{T} \tau^{t'-t} r(h_{t'})$$

where $H_t = \{h_t, \ldots, h_T\}$ represents the history of hidden states in LSTM, and $\tau \in (0,1)$ is the discount factor. $H_0$ can be interpreted as the trajectory of observations for a sample run of the policy from the initial state. For notational simplicity, we use H for $H_0$ in the description below. The goal of policy learning is transformed to find the parameters $\theta^*$ to maximize $J(\theta)$ which is defined as:

$$J(\theta) = \mathbb{E}[R(H)] = \int p(H|\theta) R_\theta(H) dH \quad \text{(Equation 4)}$$

where $p(H|\theta)$ is the probability of observing a sequence of hidden states H, given a policy $\pi$ defined by the parameters $\theta$. It can be shown that maximizing $J(\theta)$ implicitly minimizes $L_\theta$ along the trajectory of policy executions. The gradient needs to be computed with respect to the policy parameters $\nabla_\theta J$, which is given by:

$$\nabla_\theta J = \int [\nabla_\theta p(H|\theta) R_\theta(H) + p(H|\theta) \nabla_\theta R_\theta(H)] dH \quad \text{(Equation 5)}$$

Note that given the sequence of hidden states H, which determines the history of selected frames, the reward function does not depend on the policy parameters, yielding $\nabla_\theta R_\theta(H) = 0$. To further simplify Equation 5, $\nabla_\theta p(H|\theta)$ is defined. First, $p(H|\theta)$ is factorized as:

$$p(H|\theta) = p(h_0) \prod_{t=1}^{T} p(h_t|h_{t-1}) \pi(v_t|h_{t-1}, o_t)$$

where the same notation $\pi$ is used to denote the output of the policy. Based on this we have:

$$\log p(H|\theta) = const + \sum_{t=1}^{T} \log \pi(v_t|h_{t-1}, o_t)$$

where the first term is a sum over the log of $p(h_t|h_{t-1})$, a constant with respect to $\theta$. This therefore results in the following gradient:

$$\nabla_\theta \log p(H|\theta) = \sum_{t=1}^{T} \nabla_\theta \log \pi(v_t|h_{t-1}, o_t).$$

It is common to use the Monte-Carlo integration to approximate the integration over the probability of observing a sequence of hidden states. Specifically, the approximate gradient is computed by running the current policy on N training videos to generate N trajectories. Combining aforementioned derivations and Equation 5, the approximate gradient is obtained as:

$$\nabla_\theta J \approx \frac{1}{N} \sum_{n=1}^{N} \sum_{t=1}^{T} [\nabla_\theta \log \pi(v_t^n|h_{t-1}^H, o_t^n) R_\theta(h_t^n)] \quad \text{(Equation 6)}$$

Since the policy gradient methods usually suffer from the high variance of gradient estimates, a bias is subtracted from the expected reward R. However, rather than taking a constant bias, the bias value is set to be the reward obtained from a random selection policy.

Figure 2B:
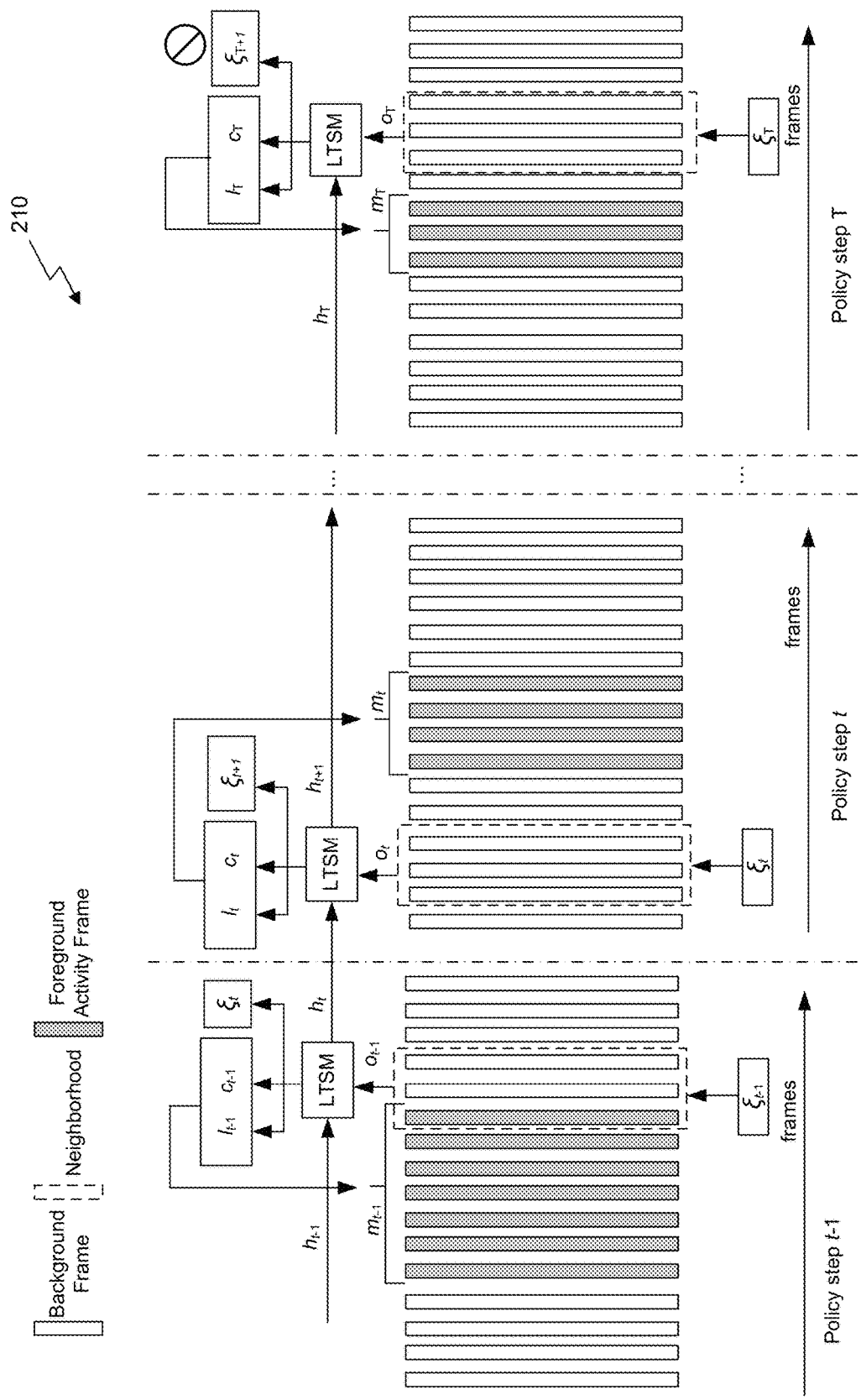
FIG. 2B illustrates a block diagram of a sequence of steps taken by a recurrent neural network to detect activity in a video according to a given time budget, in accordance with an embodiment.

FIG. 2B illustrates a block diagram 210 of a sequence of steps taken by a recurrent neural network to detect activity in a video according to a given time budget, in accordance with an embodiment. For example, the recurrent neural network described with respect to FIG. 2B may be one embodiment of the recurrent neural network described above with reference to the method 100 of FIG. 1.

As shown, a plurality of time step T are determined based on a given time or computation budget. During each time step, the global state is approximated by the internal state of LSTM, which depends on the current observation (i.e. for a selected frame and its neighboring frames) and the previous state. For example, the global state at step t is approximated by the internal state $h_t$ of LSTM, which depends on the current observation $o_t$ (i.e. of a neighborhood centered around the current selected frame and the previous state $h_{t-1}$.

For each step, the policy predicts a segment $m_t$ and produces three outputs: the temporal location lt (i.e., start and end) of the segment, the estimated class ct associated with the segment, and the next frame to observe at $\xi t+1$. According to a specified time budget, the policy runs for T steps then completes the detection process.

For each step, given the internal state of LSTM, the policy predicts a segment $m_t$ and produces three outputs: (1) the temporal location l (i.e. start and end frame) of the segment, (2) the estimated class c associated with the segment (e.g. the probability distribution over activity class labels c), and (3) the next frame to observe $\xi$ (e.g. the location of the next observation). In the example shown at step t, the outputs of the policy are $v_t = [l_t, c_t, \xi_{t+1}]$: (1) the location $l_t$ of an estimated temporal segment, (2) the probability distribution over activity class labels $c_t$, and (3) the location of the next observation $\xi_{t+1}$. This formulation allows the policy to perform both forward and backward frame selections. This formulation allows the policy to perform both forward and backward frame selections. As an option, instead of directly using $\xi_{t+1}$, the next selected location may be sampled from a Gausssian distribution with a mean equal to $\xi_{t+1}$ and a fixed variance.

Activity detection for the video, including determining the start and end frames for an activity as well as a classification for the activity, can be determined from the contents of the LSTM after the final time step.

The budget-aware method described above achieves competitive detection accuracy under various Intersection over Union (IoU) thresholds for activity detection, and further performs activity detection in only 0.35 seconds for each untrimmed long video. This is orders of magnitude faster than most other competing algorithms relying on sliding windows or segment proposals.

Figure 2C:
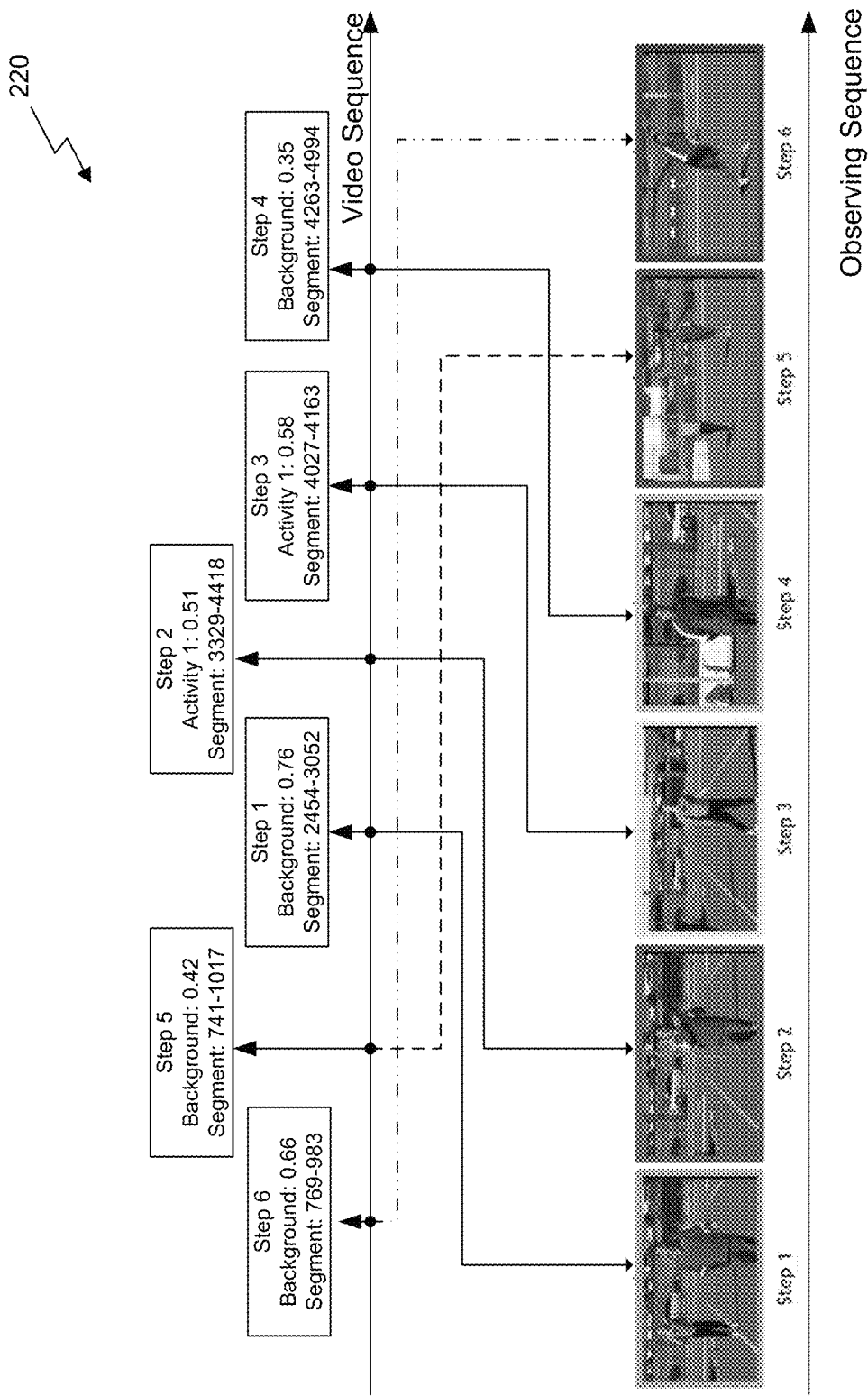
FIG. 2C illustrates an exemplary flow of activity detection for a video using a budget-aware method, in accordance with an embodiment.

FIG. 2C illustrates an exemplary flow 220 of activity detection for a video using a budget-aware method, in accordance with an embodiment. It should be noted that the activity detection shown in FIG. 2C is set forth for illustrative purposes only and a use-case of the budget-aware activity detection described above with reference to FIG. 2B.

As shown, given a time or computation budget that allows for 6 time steps, the recurrent neural network uses a policy (e.g. learned as described with respect to FIG. 2A) to detect activity in a video. At Step 1, the policy predicts activity for a given frame and its neighboring frames and outputs (1) the temporal location of the predicted segment for the activity as starting at frame 2454 and ending at frame 3052, (2) the estimated class (category) associated with the segment as being Background as well as the probability distribution for Background as 0.76), and (3) the next frame to observe (not shown). At Step 2, the policy predicts activity for (3) output by the prior time step and its neighboring frames and outputs (1) the temporal location of the predicted segment for the activity as starting at frame 3329 and ending at frame 4418, (2) the estimated class (category) associated with the segment as being Activity 1 as well as the probability distribution for Activity 1 as 0.51), and (3) the next frame to observe (not shown).

For each subsequent time step the recurrent neural network continues to use the policy to predict activity in the manner shown. In one embodiment, the recurrent neural network may directly discard the segments that are predicted as Background. Based on the history of the policy outputs over the 6 time steps, the recurrent neural network determines activities, their associated classifications, as well as their temporal locations for the video.

Parallel Processing Architecture

Figure 3:
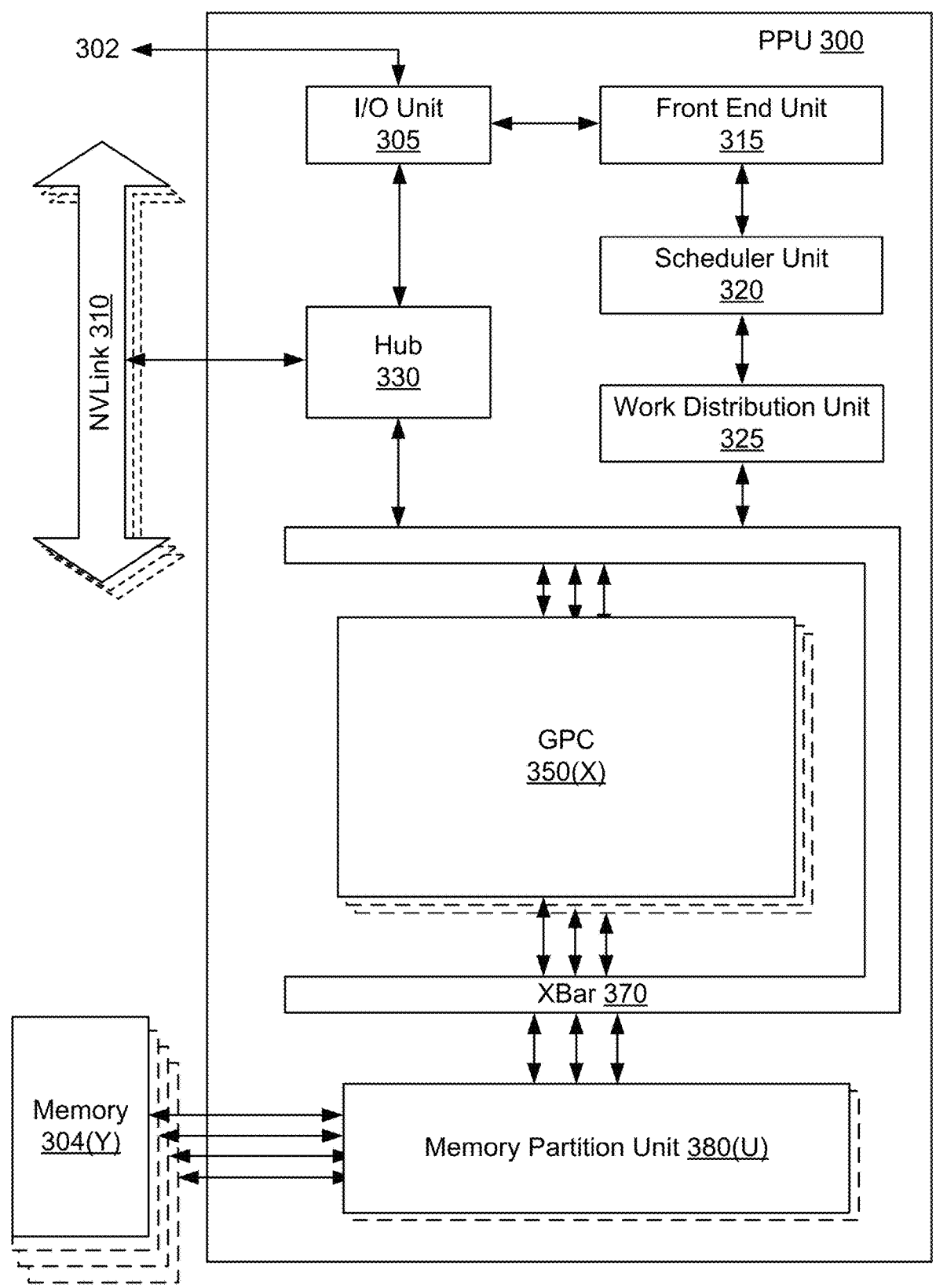
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
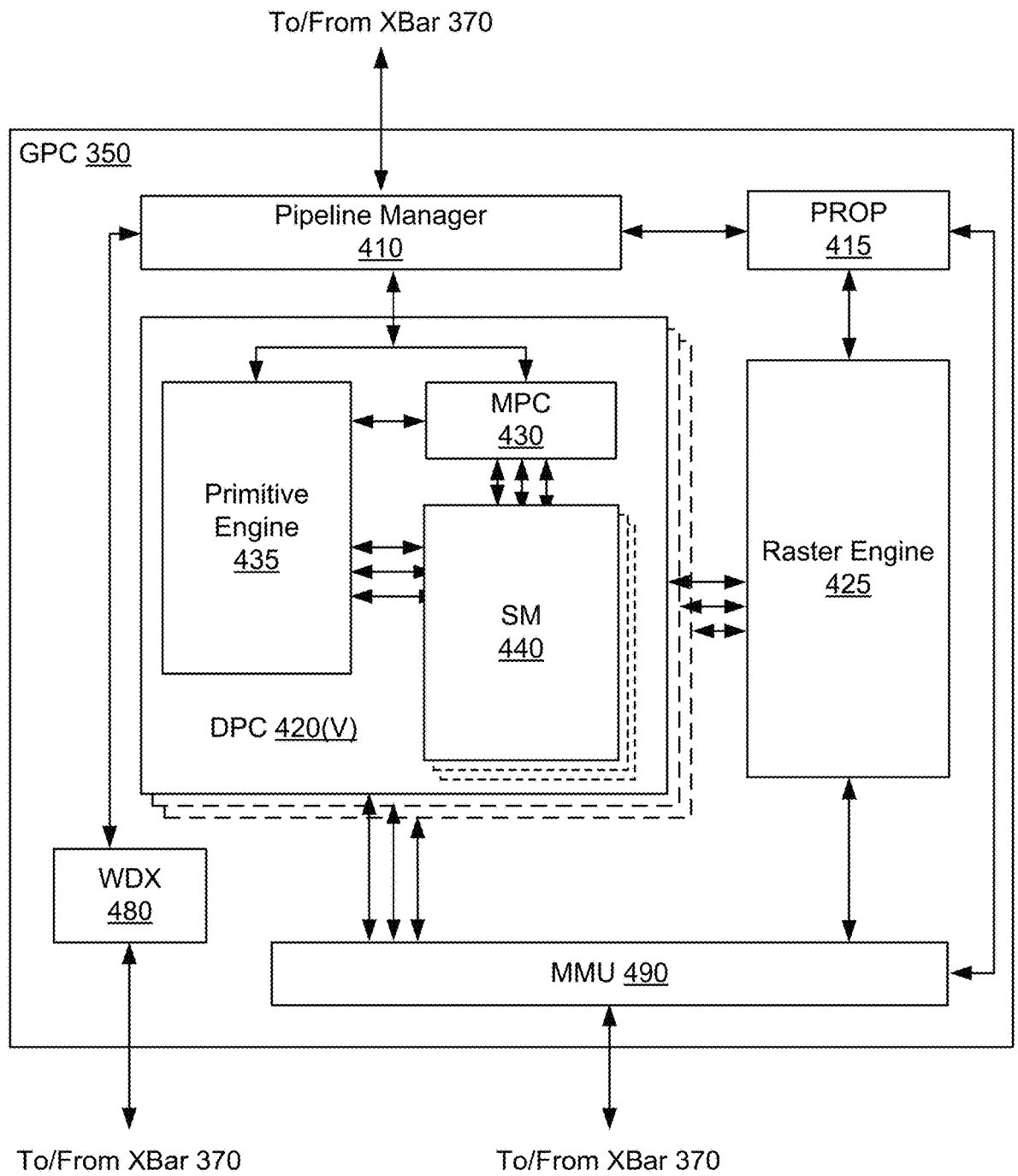
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
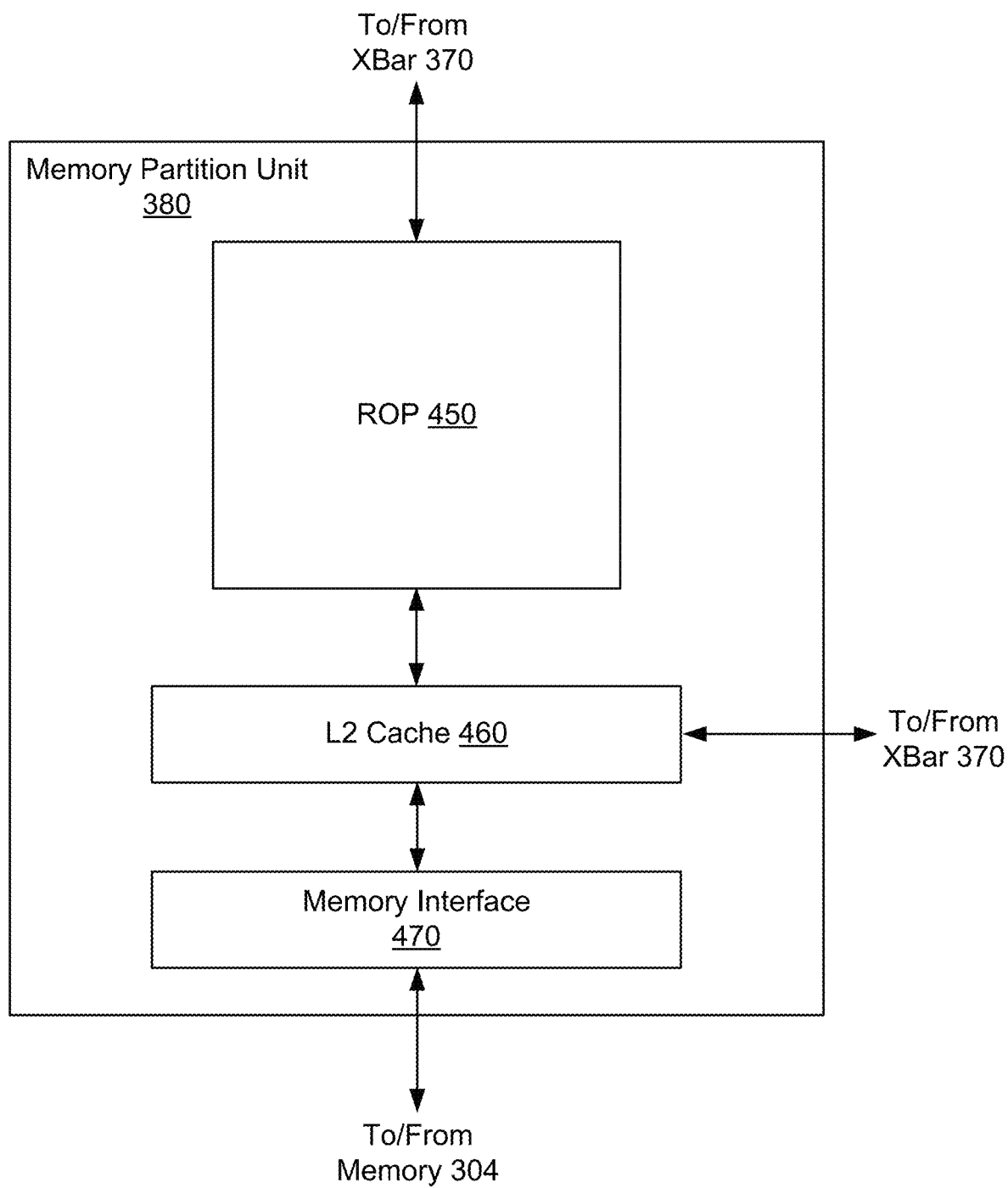
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
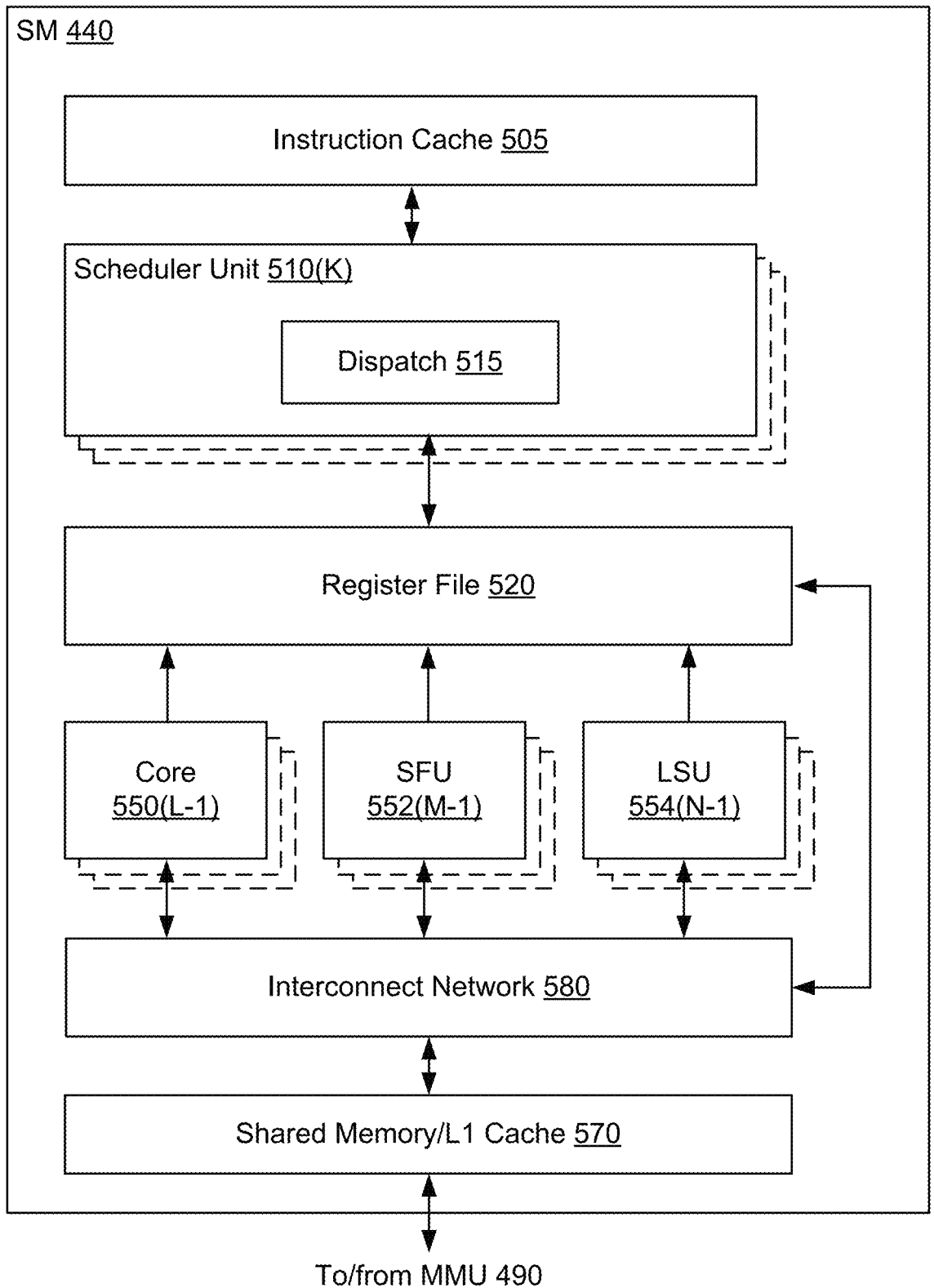
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
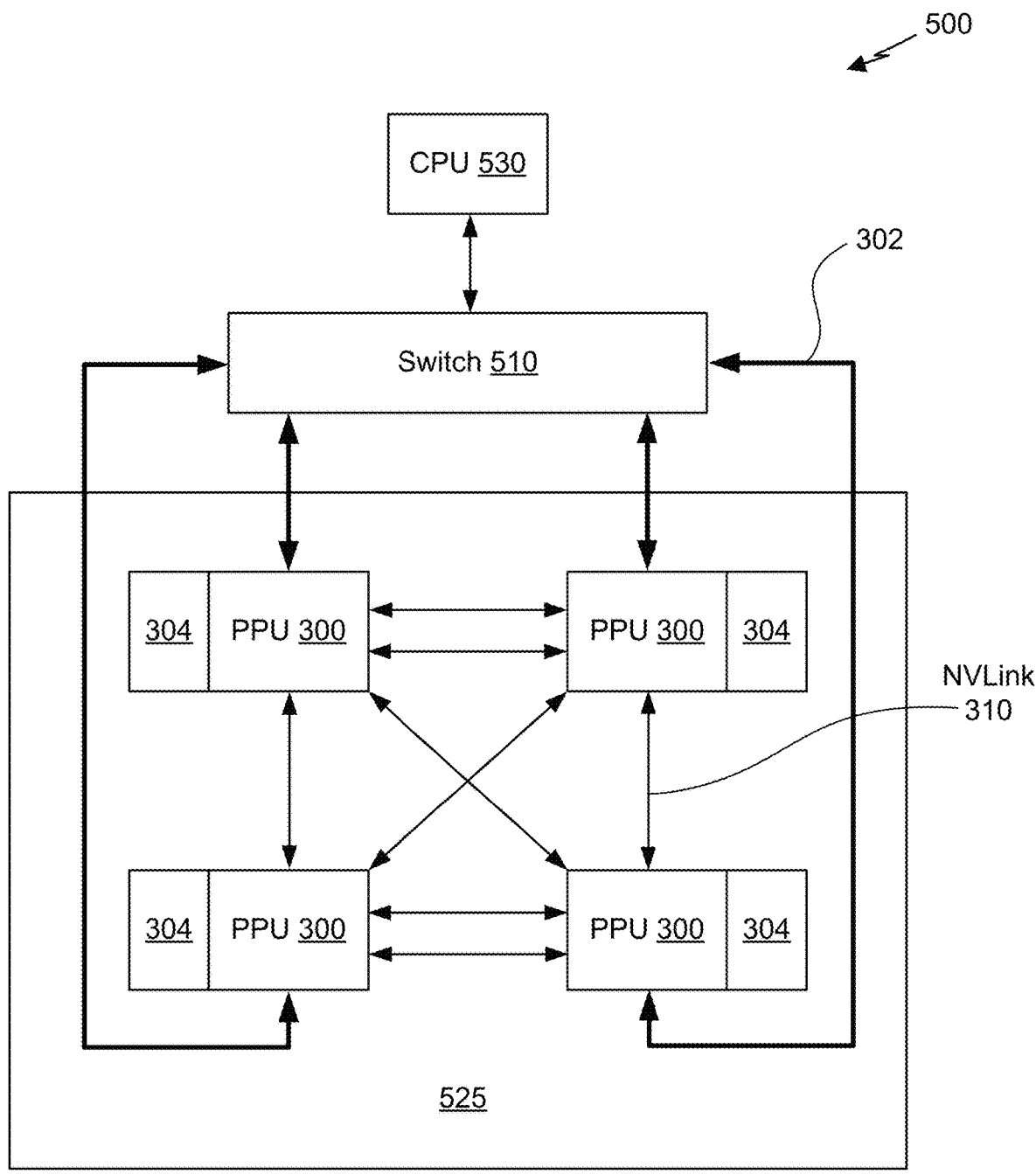
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
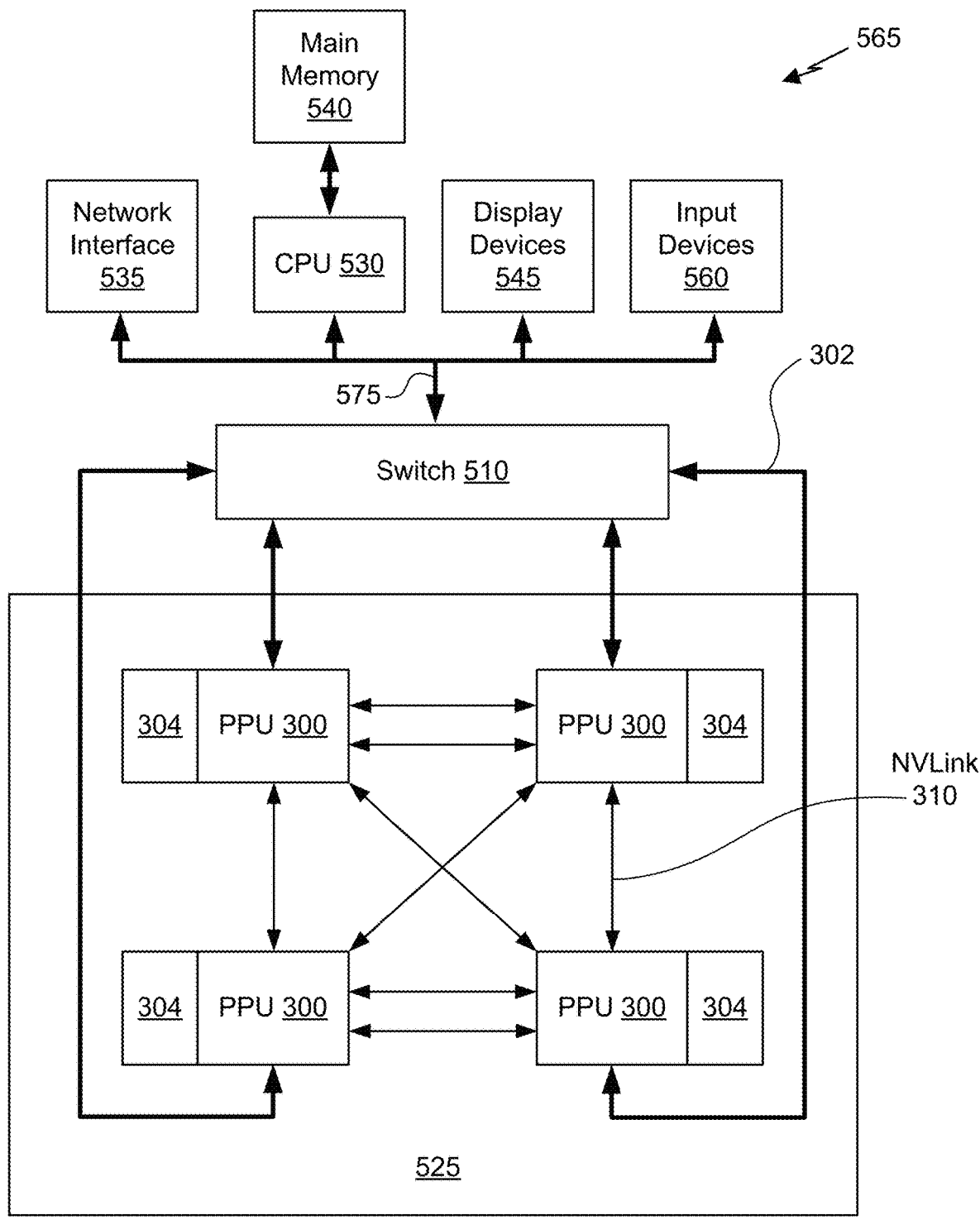
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
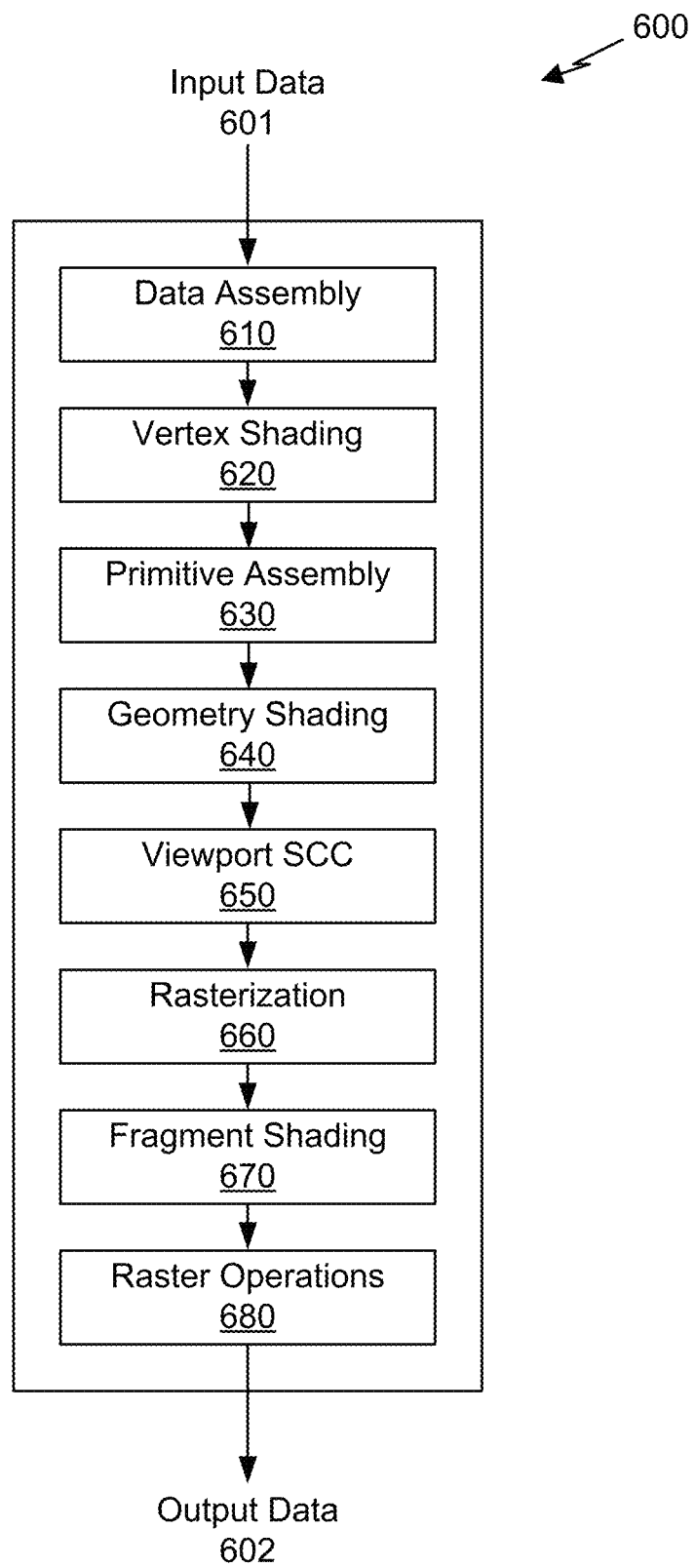
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A method for detecting activity in video, comprising:
learning, through a reinforcement learning algorithm, a policy to sequentially select frames of a video and classify activity within the video according to a plurality of predefined activity classifications;
using, by a recurrent neural network, the policy to detect and classify activity in the video over a sequence of steps, wherein a number of steps in the sequence of steps is determined according to a given time and/or computation budget, and wherein the policy, at each step in the sequence of steps, is configured to:
receive a location of a frame to observe during the step,
select a subset of frames of the video within a neighborhood of the location of the frame, and
predict, based on the subset of frames and a history of any prior observed frames, a temporal location of a segment in the video associated with an activity, one or more of the plurality of predefined activity classifications associated with the segment, and a next location for a different frame in the video to select for a next step in the sequence of steps.

2. The method of claim 1, wherein the policy is parameterized by $\theta$, and the learning is to optimize $\theta$ by minimizing a loss associated with a set of estimated segments in the video.

3. The method of claim 2, wherein the loss refers to at least one of a classification loss, a localization loss, and a retrieval loss.

4. The method of claim 1, wherein the policy is learned using a partially observable Markov decision process (POMDP).

5. The method of claim 4, wherein the policy is learned using approximation of gradients for an objective function using a recurrent policy gradient approach.

6. The method of claim 5, wherein parameters of the policy are learned with stochastic gradient descent.

7. The method of claim 1, wherein the reinforcement learning algorithm rewards the policy as a function of a change in error.

8. The method of claim 7, wherein the policy earns a reward equal to any decrease in a temporal segmentation error achieved by selecting a particular frame, and pays a penalty when the temporal segmentation error increases.

9. The method of claim 1, wherein the plurality of predefined activity classifications includes:
a first set of activity classifications for different foreground activities, and
a second activity classification for background activity.

10. The system of claim 2, wherein the loss refers to at least one of a classification loss, a localization loss, and a retrieval loss.

11. A system for detecting activity in video, comprising:
a computer processor executing a reinforcement learning algorithm to learn a policy to sequentially select frames of a video and classify activity within the video according to a plurality of predefined activity classifications; and
a recurrent neural network that uses the policy to detect and classify activity in the video over a sequence of steps, wherein a number of steps in the sequence of steps is determined according to a given time and/or computation budget, and wherein the policy, at each step in the sequence of steps, is configured to:
receive a location of a frame to observe during the step,
select a subset of frames of the video within the neighborhood of the location of the frame, and
predict, based on the subset of frames and a history of any prior observed frames, a temporal location of a segment in the video associated with an activity, one or more of the plurality of predefined activity classifications associated with the segment, and a next location for a different frame in the video to select for a next step in the sequence of steps.

12. The system of claim 11, wherein the policy is parameterized by $\theta$, and the goal of the policy learning is to optimize $\theta$ by minimizing a loss associated with a set of estimated segments in the video.

13. The system of claim 11, wherein the policy is learned using a partially observable Markov decision process (POMDP).

14. The system of claim 13, wherein the policy is learned using approximation of gradients for an objective function using a recurrent policy gradient approach.

15. The system of claim 14, wherein parameters of the policy are learned with stochastic gradient descent.

16. The system of claim 11, wherein the reinforcement learning algorithm rewards the policy as a function of a change in error.

17. The system of claim 16, wherein the policy earns a reward equal to any decrease in a temporal segmentation error achieved by selecting a particular frame, and pays a penalty when the temporal segmentation error increases.

18. The system of claim 11, wherein the plurality of predefined activity classifications includes:
a first set of activity classifications for different foreground activities, and
a second activity classification for background activity.

19. A non-transitory computer-readable media storing computer instructions for detecting activity in video that, when executed by one or more processors, cause the one or more processors to perform the method comprising:
learning, through a reinforcement learning algorithm, a policy to sequentially select frames of a video and classify activity within the video according to a plurality of predefined activity classifications;

using, by a recurrent neural network, the policy to detect and classify activity in the video over a sequence of steps, wherein a number of steps in the sequence of steps is determined according to a given time and/or computation budget, and wherein the policy, at each step in the sequence of steps, is configured to:

receive a location of a frame to observe during the step, select a subset of frames of the video within a neighborhood of the location of the frame, and predict, based on the subset of frames and a history of any prior observed frames, a temporal location of a segment in the video associated with an activity, one or more of the plurality of predefined activity classifications associated with the segment, and a next location for a different frame in the video to select for a next step in the sequence of steps.

20. The non-transitory computer-readable media of claim 19, wherein the policy is parameterized by $\theta$, and the goal of the policy learning is to optimize $\theta$ by minimizing a loss associated with a set of estimated segments in the video.

21. The non-transitory computer-readable media of claim 19, wherein the plurality of predefined activity classifications includes:

a first set of activity classifications for different foreground activities, and a second activity classification for background activity.

* * * * *